US008239622B2

(12) United States Patent
Hetzler

(10) Patent No.: US 8,239,622 B2
(45) Date of Patent: *Aug. 7, 2012

(54) DATA STORAGE ARRAY SCALING METHOD AND SYSTEM WITH MINIMAL DATA MOVEMENT

(75) Inventor: Steven Robert Hetzler, Los Altos, CA (US)

(73) Assignee: International Business Machines Corporation, Armonk, NY (US)

( * ) Notice: Subject to any disclaimer, the term of this patent is extended or adjusted under 35 U.S.C. 154(b) by 400 days.

This patent is subject to a terminal disclaimer.

(21) Appl. No.: 12/134,051

(22) Filed: Jun. 5, 2008

(65) Prior Publication Data

US 2008/0276057 A1    Nov. 6, 2008

Related U.S. Application Data

(63) Continuation of application No. 11/743,081, filed on May 1, 2007, now abandoned.

(51) Int. Cl.
*G06F 12/00* (2006.01)
(52) U.S. Cl. ........................ 711/114; 714/6.24
(58) Field of Classification Search .................. 711/206, 711/114; 714/6.24
See application file for complete search history.

(56) References Cited

U.S. PATENT DOCUMENTS

| | | | |
|---|---|---|---|
| 5,758,118 A * | 5/1998 | Choy et al. ..................... | 711/114 |
| 5,991,804 A | 11/1999 | Bolosky et al. | |
| 6,035,373 A | 3/2000 | Iwata | |
| 6,304,941 B1 * | 10/2001 | Lyons et al. .................. | 711/114 |
| 6,347,359 B1 | 2/2002 | Smith et al. | |
| 6,901,479 B2 | 5/2005 | Tomita | |
| 7,111,117 B2 * | 9/2006 | Franklin et al. ............... | 711/114 |
| 7,490,207 B2 | 2/2009 | Amarendran et al. | |
| 7,548,898 B1 | 6/2009 | Tarenskeen et al. | |
| 7,685,129 B1 | 3/2010 | Lecrone et al. | |
| 2003/0145167 A1 | 7/2003 | Tomita | |
| 2004/0205166 A1 | 10/2004 | DeMoney | |
| 2006/0075290 A1 * | 4/2006 | Hartline et al. .................. | 714/6 |
| 2006/0107097 A1 * | 5/2006 | Zohar et al. ....................... | 714/6 |
| 2008/0080526 A1 | 4/2008 | Gounares et al. | |
| 2008/0082693 A1 | 4/2008 | Meijer et al. | |
| 2008/0222375 A1 | 9/2008 | Kotsovinos et al. | |
| 2008/0276041 A1 * | 11/2008 | Hetzler ......................... | 711/114 |
| 2008/0276057 A1 | 11/2008 | Hetzler | |
| 2009/0089781 A1 | 4/2009 | Shingai et al. | |

(Continued)

OTHER PUBLICATIONS

Sobolewski, M. et al., (Mar. 2006), "Federated Grid Computing with Interactive Service-oriented Programing", Concurrent Engineering 2006, 14(1), 55-56.

(Continued)

*Primary Examiner* — Jared Rutz
(74) *Attorney, Agent, or Firm* — Shimokaji & Assoc., PC

(57) ABSTRACT

A method for rearranging data blocks in a data storage system when adding new storage devices to create an expanded data storage system. A temporary configuration is selected for which the exchange of one or more data blocks between the temporary configuration and the source configuration produces the destination configuration before identifying and exchanging data blocks between the temporary configuration and the source configuration to produce the destination configuration. A single data element transfer chain embodiment provides superior performance in an embodiment that maintains (does not reduce) the source array data storage efficiency at the destination array after scaling. When adding a single new device to an existing array, the required data movement is minimized and does not exceed the capacity of the new device.

20 Claims, 12 Drawing Sheets

U.S. PATENT DOCUMENTS

| | | | |
|---|---|---|---|
| 2009/0171999 | A1 | 7/2009 | McColl et al. |
| 2009/0265567 | A1 | 10/2009 | Nguyen et al. |
| 2009/0265706 | A1 | 10/2009 | Golosovker et al. |
| 2009/0276771 | A1 | 11/2009 | Nickolov et al. |
| 2010/0169287 | A1 | 7/2010 | Klose |

OTHER PUBLICATIONS

Hu, Y. et al. (2009), "On Media Streaming Application Migration in Pervasive Environment", Proceedings of the 1st Asia-Pacific Symposium on InternetWare, ACM.

Greiner, A. et al. (Sep. 22-24, 2009), "A Generic Hardware / Software Communication Middleware for Streaming Applications on Shared Memory Multi Processor Systems-on-Chip", IEEE, Forum on Specification & Design Languages, 1-4.

Bellavista, P. et al. (Dec. 1, 2006), "Proactive Management of Distributed Buffers for Streaming Continuity in Wired-Wireless Integrated Networks", 10th IEEE/IFIP Network Operations and Management Symposium, NOMS, 351-360.

Hirofuchi et al., "A Live Storage Migration Mechanism over WAN for Relocatable Virtual Machine Services on Clouds", 9th IEEE/ACM International Symposium on Cluster Computing and the Grid, 2009. CCGRID '09., Publication Year: 2009, pp. 460-465.

Bradford et al., "Live Wide-Area Migration of Virtual Machines Including Local {ersistent State", Proceedings of the 3rd international conference on Virtual execution environments, SESSION: Live migration, pp. 169-179, Year of Publication: 2007.

Ramakrishnan et al., "Live Data Center Migration across WANs: A Robust Cooperative Context Aware Approach", Proceedings of the 2007 SIGCOMM workshop on Internet network management, Aug. 27-31, 2007, Kyoto, Japan.

Sapuntzakis et al. "Optimizing the Migration of Virtual Computers", ACM SIGOPS Operating Systems Review, vol. 36, Issue SI (Winter 2002), OSDI '02: Proceedings of the 5th symposium on Operating systems design and implementation, Special Issue: Migration, pp. 377-390, Year of Publication: 2002.

Rudolph et al., "A Simple Load Balancing Scheme for Task Allocation in Parallel Machines", 1991, ACM, pp. 237-245.

\* cited by examiner

FIG. 1A

| | D1 | D2 | D3 | D4 | D5 |
|---|---|---|---|---|---|
| R1 | 1 | 2 | 3 | 4 | P |
| R2 | 6 | 7 | 8 | P | 5 |
| R3 | 11 | 12 | P | 9 | 10 |
| R4 | 16 | P | 13 | 14 | 15 |
| R5 | P | 17 | 18 | 19 | 20 |

+

| | D6 |
|---|---|
| R6 | |

| | D1 | D2 | D3 | D4 | D5 | D6 |
|---|---|---|---|---|---|---|
| R1 | 1' | 2' | 3' | 4' | 5' | P' |
| R2 | 7' | 8' | 9' | 10' | P' | 6' |
| R3 | 13' | 14' | 15' | P' | 11' | 12' |
| R4 | 19' | 20' | P' | 16' | 17' | 18' |
| R5 | 25' | P' | 21' | 22' | 23' | 24' |
| R6 | P' | 26' | 27' | 28' | 29' | 30' |

FIG. 1
(PRIOR ART)

|    | D1 | D2 | D3 | D4 | D5 |
|----|----|----|----|----|----|
| R1 | 1  | 2  | 3  | 4  | P  |
| R2 | 6  | 7  | 8  | P  | 5  |
| R3 | 11 | 12 | P  | 9  | 10 |
| R4 | 16 | P  | 13 | 14 | 15 |
| R5 | P  | 17 | 18 | 19 | 20 |
| R6 | 21 | 22 | 23 | 24 | P  |

FIG. 2A

|    | D1 | D2 | D3 | D4 | D5 | D6 | D7 | D8 |
|----|----|----|----|----|----|----|----|----|
| R1 | 1  | 2  | 3  | 4  | P  | 1' | 2' | P' |
| R2 | 6  | 7  | 8  | P  | 5  | 4' | P' | 3' |
| R3 | 11 | 12 | P  | 9  | 10 | P' | 5' | 6' |
| R4 | 16 | P  | 13 | 14 | 15 | 7' | 8' | P' |
| R5 | P  | 17 | 18 | 19 | 20 | 10'| P' | 9' |
| R6 | 21 | 22 | 23 | 24 | P  | P' | 11'| 12'|

Rule A: D1–D5 | Rule B: D6–D8

| | D1 | D2 | D3 | D4 | D5 |
|---|---|---|---|---|---|
| R1 | 1 | 2 | 3 | 4 | P |
| R2 | 6 | 7 | 8 | P | 5 |
| R3 | 11 | 12 | P | 9 | 10 |
| R4 | 16 | P | 13 | 14 | 15 |
| R5 | P | 17 | 18 | 19 | 20 |

+

| D6 |
|---|
| P |
| 21 |
| 22 |
| 23 |
| 24 |

| | D1 | D2 | D3 | D4 | D5 | D6 |
|---|---|---|---|---|---|---|
| R1 | 1 | 2 | 3 | 4 | P | P |
| R2 | 6 | 7 | 8 | P | 21 | 5 |
| R3 | 11 | 12 | P | 22 | 10 | 9 |
| R4 | 16 | P | 23 | 14 | 15 | 13 |
| R5 | P | 24 | 18 | 19 | 20 | 17 |

FIG. 3

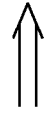
FIG. 4A
FIG. 4B
FIG. 4C
(Stripe.Slot)
FIG. 4

| D1 | D2 | D3 | D4 | D5 |
|---|---|---|---|---|
| 1.1 | 1.2 | 1.3 | 1.4 | 1.5 |
| 2.1 | 2.2 | 2.3 | 2.4 | 2.5 |
| 3.1 | 3.2 | 3.3 | 3.4 | 3.5 |
| 4.1 | 4.2 | 4.3 | 4.4 | 4.5 |
| 5.1 | 5.2 | 5.3 | 5.4 | 5.5 |

| D6 |
|---|
| 6.1 |
| 6.2 |
| 6.3 |
| 6.4 |
| 6.5 |

(Array.Slot)

| D1 | D2 | D3 | D4 | D5 | D6 |
|---|---|---|---|---|---|
| 6.1 | 1.2 | 1.3 | 1.4 | 1.5 | 1.1 |
| 2.1 | 6.2 | 2.3 | 2.4 | 2.5 | 2.2 |
| 3.1 | 3.2 | 6.3 | 3.4 | 3.5 | 3.3 |
| 4.1 | 4.2 | 4.3 | 6.4 | 4.5 | 4.4 |
| 5.1 | 5.2 | 5.3 | 5.4 | 6.5 | 5.5 |

FIG. 5B

| D1  | D2  | D3  | D4  | D5  | D6  | D7  |
|-----|-----|-----|-----|-----|-----|-----|
| 6.1 | 7.2 | 1.3 | 1.4 | 1.5 | 1.1 | 1.2 |
| 2.1 | 6.2 | 7.3 | 2.4 | 2.5 | 2.2 | 2.3 |
| 3.1 | 3.2 | 7.3 | 7.4 | 3.5 | 3.3 | 3.4 |
| 4.1 | 4.2 | 4.3 | 6.4 | 7.5 | 4.4 | 4.5 |
| 7.1 | 5.2 | 5.3 | 5.4 | 6.5 | 5.5 | 5.1 |

| D7  |
|-----|
| 7.2 |
| 7.3 |
| 7.4 |
| 7.5 |
| 7.1 |

(Array.Slot) FIG. 6

+

| D1  | D2  | D3  | D4  | D5  | D6  |
|-----|-----|-----|-----|-----|-----|
| 6.1 | 1.2 | 1.3 | 1.4 | 1.5 | 1.1 |
| 2.1 | 6.2 | 2.3 | 2.4 | 2.5 | 2.2 |
| 3.1 | 3.2 | 6.3 | 3.4 | 3.5 | 3.3 |
| 4.1 | 4.2 | 4.3 | 6.4 | 4.5 | 4.4 |
| 5.1 | 5.2 | 5.3 | 5.4 | 6.5 | 5.5 |

FIG. 6A

|   | B1 |   |   |   |   |   | B2 |   |   |   |   |   | B3 |   |   |   |   |
|---|---|---|---|---|---|---|---|---|---|---|---|---|---|---|---|---|---|
| D0 | D1 | D2 | D3 | D4 | D5 | D6 | D7 | D8 | D9 | D10 | D11 | D12 | D13 | D14 | D15 | D16 | D17 |
| 0.0 | 1.0 | 0.2 | 1.3 | 1.4 | 0.5 | 0.1 | 1.1 | 1.2 | 0.3 | 0.4 | 1.5 | 2.0 | 2.1 | 2.2 | 2.4 | 2.3 | 2.5 |

+

|   | B1' |   |   |   |   |   | B2' |   |   |   |   |   | B3' |   |   |   |   |
|---|---|---|---|---|---|---|---|---|---|---|---|---|---|---|---|---|---|
| D0 | D1 | D2 | D3 | D4 | D5 | D6 | D7 | D8 | D9 | D10 | D11 | D12 | D13 | D14 | D15 | D16 | D17 |
| 0.0 | 1.0 | 2.0 | 2.3 | 1.4 | 0.5 | 0.1 | 1.1 | 2.1 | 0.3 | 2.4 | 1.5 | 0.2 | 1.2 | 2.2 | 0.4 | 1.3 | 2.5 |

(Array.Slot)

FIG. 7

Existing 2 Bricks

| B1 | | | | | | | B2 | | | | | | |
|---|---|---|---|---|---|---|---|---|---|---|---|---|---|
| D0 | D1 | D2 | D3 | D4 | D5 | D6 | D7 | D8 | D9 | D10 | D11 |
| 0.0 | 1.0 | 0.2 | 1.3 | 1.4 | 0.5 | 0.1 | 1.1 | 1.2 | 0.3 | 0.4 | 1.5 |

New 2 Bricks

| B3 | | | | | | | B4 | | | | | | |
|---|---|---|---|---|---|---|---|---|---|---|---|---|---|
| D12 | D13 | D14 | D15 | D16 | D17 | D18 | D19 | D20 | D21 | D22 | D23 |
| 2.0 | 3.1 | 2.2 | 3.2 | 3.4 | 2.5 | 2.1 | 3.0 | 2.3 | 3.3 | 2.4 | 3.5 |

Final 4 Bricks

| B1' | | | | | | | B2' | | | | | | |
|---|---|---|---|---|---|---|---|---|---|---|---|---|---|
| D0 | D1 | D2 | D3 | D4 | D5 | D6 | D7 | D8 | D9 | D10 | D11 |
| 0.0 | 1.0 | 2.0 | 3.0 | 1.4 | 0.5 | 0.1 | 1.1 | 2.1 | 3.1 | 2.4 | 1.5 |
| D12 | D13 | D14 | D15 | D16 | D17 | D18 | D19 | D20 | D21 | D22 | D23 |
| 0.2 | 1.2 | 2.2 | 3.2 | 3.4 | 2.5 | 0.3 | 1.3 | 2.3 | 3.3 | 0.4 | 3.5 |

| B3' | | | | | | | B4' | | | | | | |

(Array.Slot)

FIG. 8

DATA STORAGE ARRAY SCALING METHOD AND SYSTEM WITH MINIMAL DATA MOVEMENT

BACKGROUND OF THE INVENTION

This invention relates generally to scaling with minimal data movement in large data storage systems having a plurality of storage blocks organized as stripes with redundancy and, more specifically, to a method for expanding a data storage array by adding new storage blocks while conserving state during the minimal data movements required to reorganize the expanded data storage system.

In a data storage subsystem storing data for a computer system, throughput and reliability are important system requirements. A Redundant Array of Inexpensive or Independent Disks (herein denominated RAID or merely "array") system meets these requirements. Viewed from a host computer, a RAID system, having a plurality of hard disk drive devices (herein denominated HDDs or merely "disks"), operates as a single logical disk. For example, a RAID-5 system is characterized in that data and corresponding parity data are stored together to improve the reliability. That is, a common exclusive-OR function of a set of N data blocks (a N+P "stripe") is calculated and stored as a parity data block (P). When a failure occurs in one of the disks constituting the RAID-5 system, the presence of redundant data enables the data stored in the faulty disk to be reconstructed by calculating the exclusive OR of data stored in the other disks by reconstructing the single data block in each stripe lost with the faulty disk.

In a RAID system, a series of logical block addresses (LBAs) are distributed and stored (arranged) on a plurality of HDDs in block units of a predetermined data length (herein denominated a data block). Such a rule of distribution and arrangement of data is commonly denominated a "striping rule." The number of HDDs embraced by the RAID system is a factor for determining the striping rule. Thus, when a user changes the number of HDDs in the system, data must be redistributed and rearranged according to a new striping rule. A change in the number of HDDs occurs typically when an HDD is added. Conventionally, when an HDD is added, data are rearranged on a plurality of HDDs in the system according to the following methods.

A first method is to rearrange the RAID system on the basis of the total number of HDDs after the addition. According to this method, a back-up of all data are written by the existing RAID system (having a "source configuration") into an auxiliary storage external to the RAID system before the new RAID system is initialized and a new striping rule (destination configuration) based on the number of HDDs inclusive of the added HDDs is determined. Then, according to this new striping rule (destination configuration), the back-up data are written to the respective HDDs in the new RAID system. The auxiliary storage backup is usually accomplished regularly during normal operation but even if no time is required to update the backup files, the rearrangement is very time-consuming, requiring hours to complete.

FIG. 1, comprising FIGS. 1A and 1B, is a diagram illustrating a reconfiguration of the data blocks in an array when adding one disk to convert a (4+P) RAID-5 system to a (5+P) RAID-5 system, according to a first method from the prior art.

Referring to FIG. 1, data streams transferred from a host computer are divided into data blocks. Individual data blocks are written to four HDDs (D1 to D4) in sequence at the block unit (Block 1 to Block 4). And in the fifth HDD (D5), the exclusive OR of these data blocks (Block 1 to Block 4) (hereinafter, referred to as parity Block P) is written. Row R1 includes four data blocks (Block 1 to Block 4) and a computed parity block (Block P), which is the parity of these four data blocks. As shown in FIG. 1A, data blocks and the related parity block are also written for the subsequent rows in the respective HDDs with the usual left-symmetric parity rotation.

When the sixth HDD D6 is added to the system, the data in Blocks 1-20 are backed up and thereafter the rearrangement is carried out in each HDD of the initialized system at the block level according to a new (5+P) striping rule. Because the number of blocks in Row R1 increases by one (Block 1' to Block 5'), parities of data in the five blocks are newly calculated to determine a parity block (Block P'). In a similar manner, rearrangement of data blocks and calculation and arrangement of a parity block are repeatedly executed for Rows R2-R6 with the usual left-symmetric parity rotation substantially as shown in FIG. 1B.

In some data storage systems, the RAID system can be adjusted from the layout of FIG. 1A to that in FIG. 1B by moving data blocks within the array according to a "RAID extension" process known in the art. Such an approach has two striping layouts, and at least one boundary, but may be accomplished without the use of external storage. Despite this feature, completing the data movement still requires a very long time (many hours) because almost every block in the array must be moved. The data are usually backed up to protect against a system error during the "RAID extension" process but the process does not require an external data store. In the above example, (FIG. 1), all data from five disks must be read and the contents of six disks written (assuming the sixth disk starts empty) to obtain consistent parity. Essentially, the entire array must be rewritten.

This RAID extension process is favored in the art because the data storage efficiency is maximized, which many practitioners consider desirable. As used herein, the term "data storage efficiency" denotes the ratio of the total non-parity data storage capacity divided by the total data storage capacity of the data storage system, which in this example is increased from 80% in FIG. 1A to 86.67% in FIG. 1B. Without using an external backup store, the rearrangement example shown in FIG. 1 may be accomplished, for example, by the following steps:

(a) leave Blocks 1-4 in position;
(b) compute P' from Blocks 1-5 and write P' to D6R1;
(c) move Block 5 from D5R2 to D5R1, which is available because of the new P' in D6R1;
(d) move Block 6 from D1R2 to D6R2, which is empty;
(e) move Block 7 from D2R2 to D1R2;
(f) move Block 8 from D3R2 to D2R2;
(g) move Block 9 from D4R2 to D3R2;
(h) compute P' from Blocks 6-10 and write P' to D5R2, which was earlier vacated by Block 5;
(i) move Block 10 from D5R3 to D4R2, which is available because of the new P' in D5R2; and so forth in this manner using the empty (unallocated) space on disk 6 for temporary storage.

Although not commonly used in the art, another method is to newly construct a RAID system with added HDDs that are configured with a striping rule independently from the existing RAID before modification. FIG. 2 is a diagram illustrating a reconfiguration of the data blocks in an array created by adding three disks to a 5-disk (4+P) RAID-5 system to create an 8-disk RAID operating with two independent (4+P) and (2+P) striping rules. Independently of the existing RAID source configuration (FIG. 2A) including five HDDs (D1-D5), a second (destination) RAID (FIG. 2B) is formed by adding three new HDDs (D6-D8) made accessible as a separate logical unit according to a different (2+P) striping rule.

Such conventional methods have the following problems. In the first method of FIG. 1, the host computer cannot access this system when data has been erased and the system is initialized. Because RAID systems are expected to be always available, the down-time required for reconfiguration and initialization of the RAID system is a serious problem. Also, the requisite auxiliary storage of large capacity for the temporary back-up of data adds to the cost of the data storage system.

In the second method (FIG. 2), as the RAID is divided into two or more independently configured systems, system performance is reduced compared to a single RAID system having the same number of HDDs, for two reasons. First, the distribution of data reduces the HDD accesses per HDD for a larger the number of HDDs constituting the RAID. Thus, in the example of FIG. 2, the data performance is higher for an 8-HDD RAID system collectively than for two 5-HDD and 3-HDD RAID systems. Secondly, the complexity of controlling a plurality of separate RAID systems lowers overall data storage system performance. Finally, the "data storage efficiency" is decreased from 80% in FIG. 2A to 75% in FIG. 1B, which is generally undesirable in the storage arts.

Accordingly, there is a well-known and universal need to improve the reliability and speed of procedures for increasing the storage capacity of existing data storage systems as the needs increase. Standard RAID arrays, such as RAID-5 and RAID-6 make this a tedious prospect. The user must either add a new array or perform a lengthy data element reconfiguration process. For example, extending a RAID-5 system from seven disks to eight disks requires reading the entire data contents of the array (six disks worth excluding redundant parity data) before re-writing all of the data and parity onto the eight disks. During this expansion (scaling) process, the existing data may be available from an in-situ copy but the new data storage system capacity is unavailable to the host computer until the process is completed.

The art is replete with proposals for resolving some of these problems. For example, U.S. Pat. No. 6,304,941, Lyons et al. disclose a method and apparatus for reducing processor operations when adding a new drive to a raid-6 drive group. Their method reduces the number of transactions that take place between the RAID subsystem controller and the RAID device during the installation of a new drive by transferring the installation process from the controller to the new drive. Their system is also directed towards reducing the time required to install a new drive to a RAID system by allowing the multiple drive processor to accomplish the installation. Their method reduces the time to install a new drive to a RAID device by following the individual processes to accomplish the installation. The installation is accomplished in parallel with each drive managing the rearrangement of the data segments on every other drive. This frees the controller from managing the rearrangement of the data segments.

As another example, in U.S. Pat. No. 6,347,359, Smith et al. disclose a method for reconfiguration of RAID data storage systems. Their system optimizes the reconfiguration by determining if a combination of changes to system parameters and possible rebuilding operations can replace the migration process, and, if this is possible, the reconfiguration process is modified to eliminate data migration. The array controller of the system pursues the various level of optimization by changing parameters stored in the reserved storage areas without the need for data migration.

In U.S. Pat. No. 5,991,804, Bolosky et al. disclose a method for reconfiguring the file server in an efficient manner following a change in system capacity. The controller performs the reconfiguration in multiple phases, and the data servers perform the last two phases in parallel. The order of the last two phases depends upon whether one or more storage disks are being added or removed from the system. Their method pursues a second layout strategy to optimize the starting locations of the data files so that each data file starts on the disk and results in moving the least number of data blocks during the second phase of the re-striping process.

In U.S. Pat. No. 6,901,479, Tomita discloses a method for expanding the storage capacity dynamically by adding a disk drive. The disk array includes a plurality of disk drives. The disk array has a redundant disk configuration so that, even if any one of the disk drives fails, the data in the troubled disk drive can be regenerated (or recovered). The controller writes simultaneously in the disk array of data on the write buffer and generates one stripe segment of parity data. As the disk drive has been added to the disk array, the data is written simultaneously into an empty stripe of the disk array after the disk drive is added, according to a new striping rule that corresponds to the disk array after the expansion of the storage capacity. When writing the data simultaneously into the disk array, the controller updates the restructured address translation table.

As a further example, in U.S. Pat. No. 6,035,373, Iwata discloses a method for rearranging data in a disk array system when a new disk storage unit is added to the array. The number of data storage units may be increased without requiring the back-up of stored data. In addition, after the completion of data rearrangement, a system including the newly added data storage units can be composed. Thus, the load per data storage unit can be reduced and the performance of data accesses can be improved.

Thus, there is still a clearly-felt need to increase the storage capacity of disk systems during operation as the user's storage needs increase without the downtime needed for the tedious data transfers required in the art for standard RAID systems. There is also a clearly-felt need for a method that minimizes the required data movement when adding a disk to an existing RAID system. Further, there is a clearly-felt need for a method that instantly makes available the expansion capacity without a delay for completion of the necessary data movement and without risk of data loss upon failure of any system components.

SUMMARY OF THE INVENTION

Various embodiments of the system and method of this invention solve one or more of these problems by introducing a method for rearranging data blocks in a data storage system when adding new storage devices to create an expanded data storage system. When adding a single new device to an existing array, the required data movement is minimized and does not exceed the capacity of the new device. In one embodiment, the theoretical minimum data movement is sufficient (less than the capacity of one disk per new disk added) for any number of disks in the source array. In another aspect, the use of a strong array code (sufficient Hamming distance), such as (3+3P), permits the new capacity to be made available instantly, without waiting for completion of the data movement. In yet another aspect, a single data element transfer chain embodiment provides superior performance. In another aspect, data transfer performance is sharply increased using an unexpectedly advantageous embodiment that retains (does not reduce) the source array data storage efficiency at the destination array after scaling.

An aspect of the invention is a method for rearranging data blocks in a data storage system including N coupled storage devices having a source data element configuration and a source data storage efficiency $E_S$, when adding M coupled storage devices to create an expanded data storage system including (N+M) coupled storage devices having a destination data storage efficiency $E_D$, wherein M and N are positive integers, the method comprising the unordered steps of selecting a destination data element configuration for the (N+M) coupled storage devices that provides the destination data storage efficiency $E_D$, selecting a temporary data element configuration for the M coupled storage devices for which the exchange of one or more data blocks between the temporary data element configuration and the source data element configuration produces the destination data element configuration, identifying the data blocks that can be exchanged between the temporary data element configuration and the source data element configuration to produce the destination data element configuration, and exchanging the identified data blocks between the temporary data element configuration and the source data element configuration to produce the destination data element configuration having the destination data storage efficiency $E_D$.

Another aspect of the invention is a data storage system including N coupled storage devices with a source data element configuration, and program elements for rearranging data blocks when adding M coupled storage devices having a temporary data element configuration to create an expanded data storage system including (N+M) coupled storage devices having a destination data element configuration, including a first program element for selecting a temporary data element configuration for which the exchange of one or more data blocks between the temporary configuration and the source configuration produces the destination configuration, a second program element for identifying the data blocks that can be exchanged between the temporary configuration and the source configuration to produce the destination configuration, and a third program element for exchanging the identified data blocks between the temporary configuration and the source configuration to produce the destination configuration.

Yet another aspect of the invention is an article of manufacture for use in a data storage system including a computer readable storage medium, a computer program code embodiment in the medium that causes the data storage system to select a temporary data element configuration for which the exchange of one or more data blocks between the temporary configuration and the source configuration produces the destination configuration, a computer program code embodiment in the medium that causes the data storage system to identify the data blocks that can be exchanged between the temporary configuration and the source configuration to produce the destination configuration, and a computer program code embodiment in the medium that causes the data storage system to exchange the identified data blocks between the temporary configuration and the source configuration to produce the destination configuration.

The foregoing, together with other aspects, features and advantages of this invention, can be better appreciated with reference to the following specification, claims and the accompanying drawing.

BRIEF DESCRIPTION OF THE DRAWING

For a more complete understanding of this invention, reference is now made to the following detailed description of the embodiments as illustrated in the accompanying drawing, in which like reference designations represent like features throughout the several views and wherein:

FIG. 1, comprising FIGS. 1A and 1B, is a diagram illustrating a reconfiguration of the data blocks in an array when adding one disk to convert a (4+P) RAID-5 system to a (5+P) RAID-5 system, according to a first method from the prior art;

FIG. 2, comprising FIGS. 2A and 2B, is a diagram illustrating a reconfiguration of the data blocks in an array created by adding three disks to a 5-disk (5+P) RAID-5 system to create an 8-disk RAID operating with two independent (5+P) and (2'+P') striping rules, according to a second method from the prior art;

FIG. 3, comprising FIGS. 3A and 3B, is a diagram illustrating a reconfiguration of the data blocks in an array when adding one disk to convert a five-disk (4+P) RAID-5 to a (4+P) RAID-5 spanning six disks in accordance with the present invention;

FIG. 4, comprising FIGS. 4A-4C, is a diagram using (stripe.slot) data element notation to illustrate an exemplary embodiment of a data element reconfiguration method for converting a five-disk (4+P) RAID-5 to a (4+P) RAID-5 spanning six disks and then to a (4+P) RAID-5 spanning seven disks in accordance with the present invention;

FIG. 5 comprising FIGS. 5A and 5B, is a diagram using (array.slot) data element notation to illustrate an alternative embodiment of a data element reconfiguration method for converting a five-disk (4+P) RAID-5 to a (4+P) RAID-5 spanning six disks in accordance with the present invention;

FIG. 6 comprising FIGS. 6A and 6B, is a diagram using (array.slot) data element notation to illustrate converting a six-disk (4+P) RAID-5 to a (4+P) RAID-5 spanning seven disks using the data element reconfiguration method of FIG. 5;

FIG. 7 is a diagram illustrating an exemplary data element reconfiguration method of this invention for adding a new six-disk (3+3) brick to an existing two-brick (3+3) array to produce a three-brick array in accordance with the present invention;

FIG. 8 is a diagram illustrating the data element reconfiguration for adding two new six-disk (3+3) bricks to an existing two-brick (3+3) array to produce a four-brick array according to the method of FIG. 7;

FIG. 9, comprising

DETAILED DESCRIPTION OF THE EMBODIMENTS

Figure 9A:
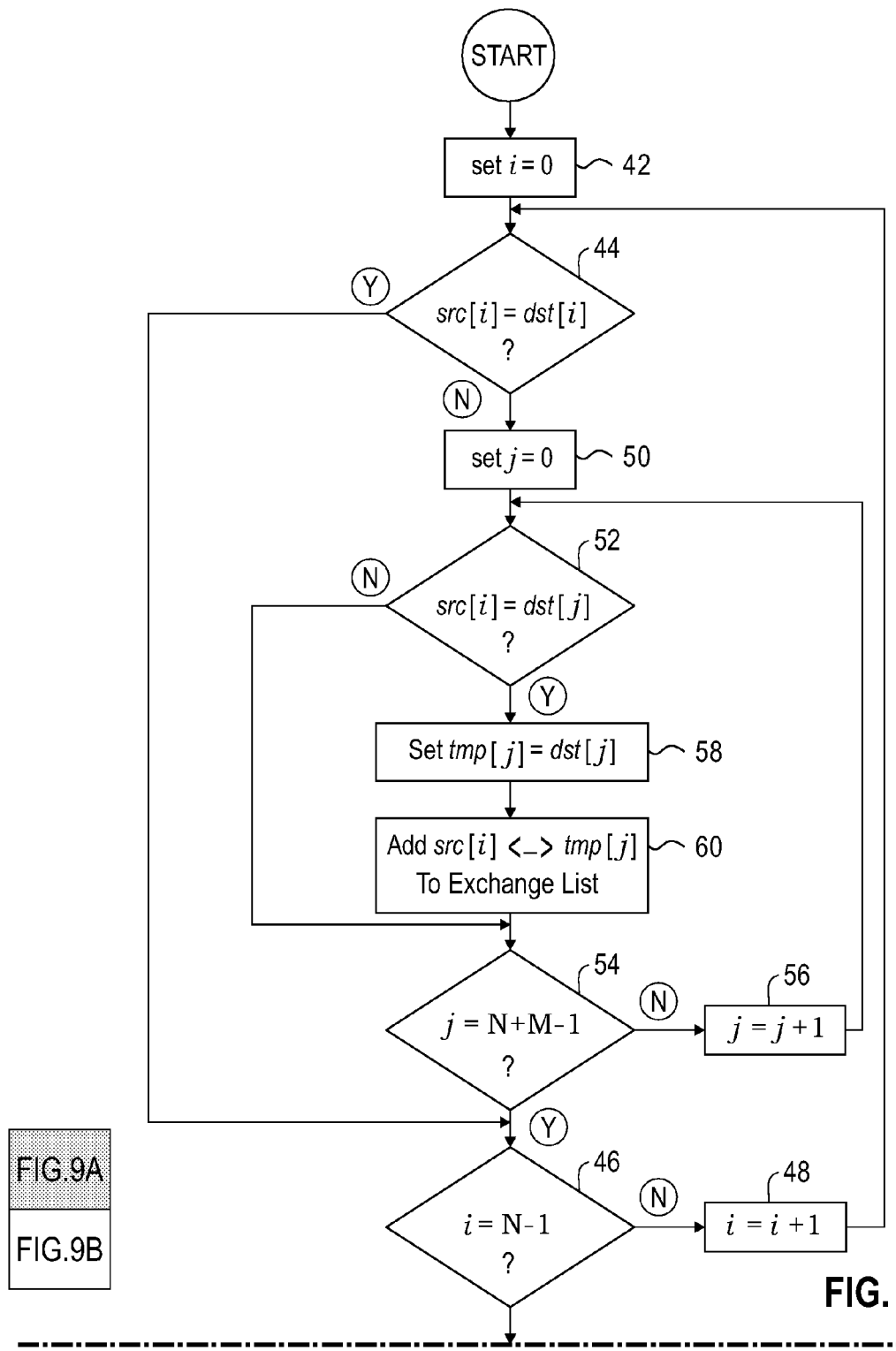
FIGS. 9A-B, is a flow chart diagram illustrating an exemplary embodiment of the data storage scaling method of this invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

While the existing methods for scaling a Redundant Array of Inexpensive or Independent Disks (herein denominated RAID or merely "array") system provides the proper parity rotation, maintains the failure tolerance and increases the efficiency of the scaled array, the array efficiency also may be maintained by using a different method; for example, by making stripes of (4+P) spread over the six disks instead of converting to a (5+P) configuration and by introducing new data element configurations that minimize the data movement required when scaling an array without losing the proper parity rotation, failure tolerance or efficiency in the scaled array.

FIG. 3 shows one such mapping. FIG. 3A shows the source configuration for the existing (4+P) on five disks (D1-D5), and FIG. 3B shows the destination configuration after reconfiguring the array as (4+P) on six disks (D1-D6). The method shown differs from the conventional declustered parity rule because, for example, the new data blocks (Block 21 to Block 24) may be distributed down a diagonal, such that the parity stripe can be (21, 22, 23, 24, P), substantially as shown. This can require moving only the data blocks 5, 9, 13 and 17, thereby moving less than the contents of one disk while maintaining the (4+P) properties of the array.

Now, this concept is described in a more generalized form, by introducing a new data element notation. Instead of listing the block orders and types, the block type is labeled using a (stripe.slot) notation where each parity stripe is considered as a separate array of data elements and where the "slot" refers generally to the location of an element in an array and specifically to a data block in a stripe of blocks in this example. Thus, FIGS. 4A-4B show the example of FIG. 3 redrawn in this more general notation without reference to the left-symmetric parity rotation, which may be applied in any manner to configurations of the stripes. FIG. 4A shows the source configuration of the existing five-disk (4+P) array and FIG. 4B shows the destination configuration of the scaled six-disk (4+P) array. This (stripe.slot) notation clearly reveals the loss tolerance of the array as FIG. 4 clearly shows that each column (disk) has no duplicate stripe numbers, thereby ensuring the loss of no more than one data block (slot) per stripe array upon failure of any single disk. This procedure adds the blocks for the new stripe on the left/down diagonal starting from the first block on the new disk D6. As can be seen, if the initial array configuration has N disks, there are N rows in the source data element configuration. Thus, when adding one new disk, only (N−1) blocks of data are moved. FIG. 4C shows the destination configuration of the scaled seven-disk (4+P) array created by adding a new disk to the six-disk (4+P) array of FIG. 4B, for example. This pattern may be repeated indefinitely as each of any number more disks area added to the system.

This procedure is one example of the minimum movement method. It may easily be shown that the theoretical minimum movement is (N−1) for this example. A requirement of maintaining failure tolerance in any RAID is to assign at most one block from a given stripe (parity set) on any one disk. Therefore, when a new disk is added to an array of N stripes, one block on the new disk can be assigned to the new stripe, but each of the other (N−1) blocks in the new disk must be assigned to a different one of the other stripes. This minimum movement method can be extended for application to many other stripe lengths and many other array sizes. Moreover, the new stripe may be placed on any diagonal. Any destination configuration that places at most one block from the new stripe on any single disk is useful for this minimum data movement method.

However, in some applications, these data block configuration patterns have a disadvantageous side effect; with increasing destination array size, the data blocks of a particular parity stripe that are separated by the first diagonal continue to disperse. This essentially keeps the stripes intermingled as disks are added, increasing control complexity and reducing performance somewhat. A small adjustment to the method of FIG. 4 can mitigate this effect, at the cost of an additional data block movement; that is, by moving N blocks instead of (N−1) blocks.

One example is shown in FIG. 4. The new rule adds the new stripes down diagonals contained entirely within the original set of N disks. Allowing an N-block movement eliminates the gradual separation of data block within a stripe as the system grows. When the RAID grows to ten (2N) disks, all stripes of the original array are grouped together but transposed to a diagonal arrangement instead of the original row arrangement. When more disks (2N+1 to 3N) are added, the new data blocks (slots) are added down the reverse diagonal in the second group of (N+1 to 2N) disks. Once the RAID size is 3N disks, the original configuration is recreated on the third group of disks (2N+1 to 3N). Thus, this method gives a cyclic destination configuration and leaves each group of N disks with a complete set of N independent stripes, thereby reducing control complexity in the destination array.

There are further advantages to such an approach when used with an array code of sufficiently high Hamming distance, such as 3+3 (3 data blocks and 3 parity blocks), which has a Hamming distance of 4, and therefore can tolerate the loss of any three disks from a set of six without loss of data. If a disk is added to an array that has the full Hamming distance, it may be acceptable to allow the system to drop to a Hamming distance of 3 during the extend operation. This may be achieved by treating the blocks to contain the new stripe as having failed, for example. The old data can then be "reconstructed" onto the new blocks in the background. This provides an "instant" capacity upgrade. Note that unlike RAID-5 or RAID-6, the 3+3 array code needs no synchronization to provide full data protection.

Another option for achieving "hot" scaling is to use a "copy-on-write" policy, whereby the new space is made available instantly, but the old data are copied out only when there is a write to a location in either the new stripe or the stripe to be moved. This also may provide an instant capacity upgrade to the end user but does not reduce the effective Hamming distance during the data movement operation and therefore may be a preferred method. The "copy-on-write" method entails additional complexity for tracking the data movements and locations until the operation completes. It may be suitable to non-symmetric RAID as well, although synchronizing writes may be required (e.g. in RAID-5, when writing the empty space, the fill parity must be computed, not updated from the previous values).

In the above discussion of the data element configuration method, the (stripe.slot) data element notation is introduced, where the "stripe" refers to an array of data blocks and the "slot" refers to the location of an element in the stripe array. This notation may be further generalized as an (array.slot) notation, where the "slot" again refers to the location of an element in an array, such as a data block, for example, and the "array" refers generally to an array, such as a stripe of N data blocks, for example.

When bringing new capacity into the system, it may be desirable to provide the host with immediate access to the new storage space. Therefore, it may be beneficial to assign storage blocks in the new space before initiating the data movement. There are also several other criteria that influence the choice of the starting block assignments in the new space, such as ensuring that all data movements are block exchanges and maximizing the protection from controller failure in the destination system.

FIG. 5 is a diagram using (array.slot) data element notation to illustrate an alternative embodiment of a data element reconfiguration method for converting a five-disk (4+P)

RAID-5 with the source configuration shown in FIG. 5A into a six-disk (4+P) RAID-5 with the destination configuration shown in FIG. 5B. If the new blocks are arranged as shown on disk D6 before the movement, then data exchanges alone are sufficient to achieve the final configuration in FIG. 5B. Specifically, the data block exchanges required are:

| |
|---|
| 1.1 <–> 6.1 |
| 2.2 <–> 6.2 |
| 3.3 <–> 6.3 |
| 4.4 <–> 6.4 |
| 5.5 <–> 6.5 |

This trivial symmetric result is different when adding a seventh disk, however, and FIG. 6 shows the new situation when a seventh disk is added. In this case, forcing the data movements to be limited to a series of data block exchanges requires the temporary (initial) data element configuration shown for the disk D7, where the first block on disk D7 is assigned to block 7.2 instead of block 7.1. This temporary configuration is forced by (a) the simple exchange-only rule and (b) the desired destination configuration shown in FIG. 6B. If the temporary configuration for D7 is arranged as shown before the data movement, then data block exchanges alone are sufficient to achieve the destination configuration. Specifically, the data block exchanges required are:

| |
|---|
| 1.2 <–> 7.2 |
| 2.3 <–> 7.3 |
| 3.4 <–> 7.4 |
| 4.5 <–> 7.5 |
| 5.1 <–> 7.1 |

If the temporary data element configuration of disk D7 is established in the conventional sequential order (7.1, 7.2, 7.3, 7.4, 7.5) shown for disk D6 in FIG. 5A, the destination configuration shown in FIG. 6B cannot be achieved without resorting to a chained data block move longer than a simple exchange.

This method may be further extended to applications where the error correction code is used to protect against both single disk and single controller failures. Such systems arrange the stripes to cross controller boundaries in a manner analogous to the above discussion of RAID disk striping rules. For example, consider a system using a (3+3) array code, for example, and with a set of controllers, each controller being attached to six disks, for example, where the controller and six disks are packaged as a single module herein denominated a "brick." The system should be configured to permit growth by adding one or more bricks (units of a controller plus six disks), instead of merely adding individual disks. Such an approach may be useful in many applications where the controller and disks are packaged as a "brick." The system should also be permitted to start with one brick and grow to an arbitrary number of bricks in arbitrary increments while providing full protection against single controller failure in each configuration.

The above discussion introduces the (array.slot) data element notation for parity stripe arrays, which can be further extended for application to the following examples, where the "slot" again refers to the location of an element in an array, such as a disk, for example, and the "array" refers to an array of data elements, such as a brick of N disks, for example.

An example is shown in FIG. 7, where a new six-disk (3+3) brick B3 is added to an existing two-brick (3+3) array (B1+B2) to produce a three-brick array (B1+B2+B3) encompassing 18 disks, using a 0-based sequential convention for the array and slot elements. The temporary data element configuration (choice of slot assignments) of brick B3 is established before any data movement to ensure that exchanges alone are sufficient to bring the system to final (destination) configuration. Specifically for the example of FIG. 7, the data block exchanges required are:

| |
|---|
| 0.2 <–> 2.0 |
| 1.2 <–> 2.1 |
| 0.4 <–> 2.4 |
| 1.3 <–> 2.3 |

The data element assignments for disks D15 and D16 are modified from the conventional sequential configuration in the starting configuration, so that disk D15 is assigned element 2.4 and disk D16 is assigned element 2.3. This arises directly from the destination configuration desired for the three brick data storage system to ensure that system state is preserved in the event of any single disk or controller failure. It may be readily appreciated that if the elements in brick B3 were arranged sequentially (2.0, 2.1, 2.2, 2.3, 2.4, 2.5), then the exchange property is lost.

This method embodiment is similar for other numbers of bricks, and when adding more than one brick at a time, and may be formally generalized as now described.

Figure 9B:
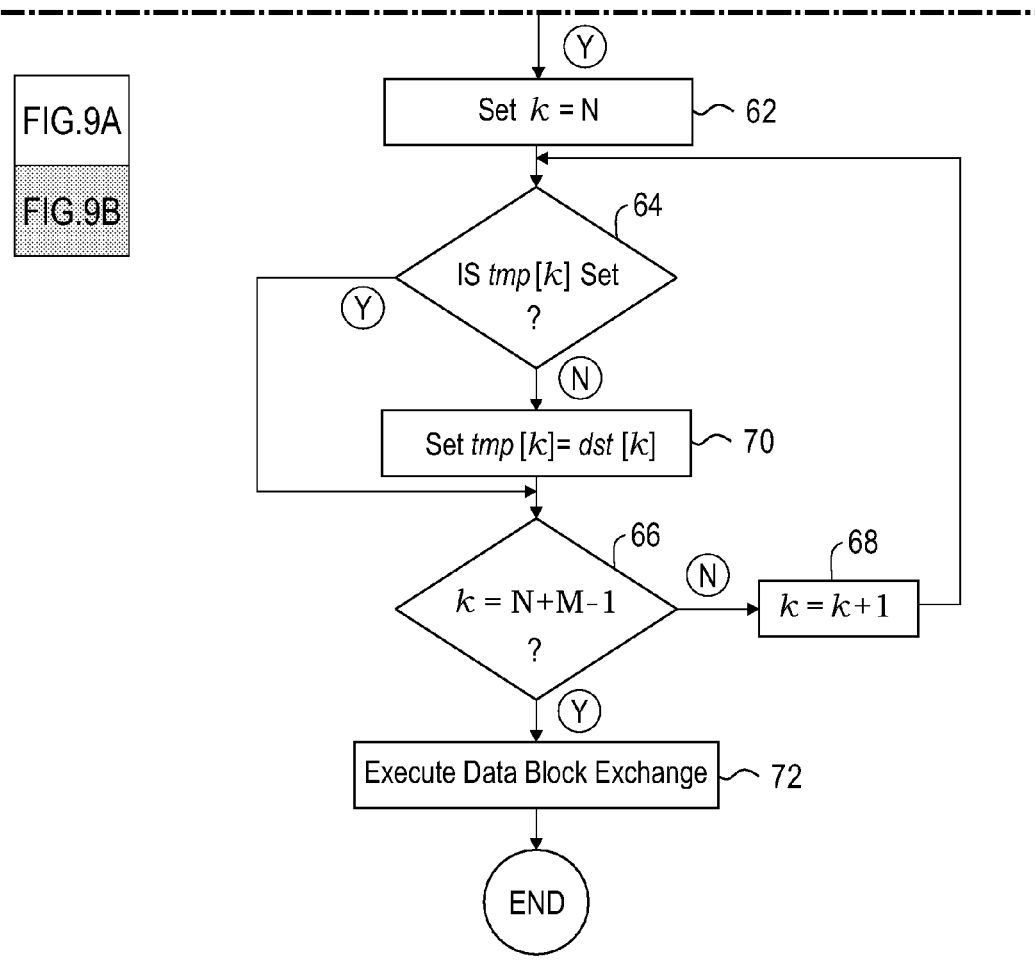

FIG. 9 is a flow chart diagram illustrating an exemplary embodiment 40 of the data storage scaling method of this invention. After specifying the destination data element configuration for the scaled system (using specific failure protection and Hamming distance criteria, for example), scaling method 40 determines the temporary data element configuration for new slots added to an existing array having a source data element configuration before making the appropriate data block exchanges necessary to create the specified destination data element configuration. The following symbol definitions are used in the description of scaling method 40:

Let N=the number of existing slots;
Let M=the number of new slots;
Let i=a source array index spanning the existing N-slot array from 0 to (N−1);
Let src[i]=the initial (array.slot) configuration of the $i^{th}$ disk of the N existing slots;
Let j=a destination array index spanning the scaled array from 0 to (N+M−1);
Let dst[j]=the final (array.slot) configuration of the $j^{th}$ disk of the combined (N+M) slots;
Let k=a temporary array index spanning the M new slots from N to (N+M−1);
Let tmp[k]=the pre-determined starting (array.slot) configuration of the $k^{th}$ disk of the M new slots;

A step 42 of method 40 initiates a loop on the source array index i by setting i=0. Step 44 tests src[i] for equality to dst[i] and, if "Yes," drops to the end of the i loop at step 46, where i is incremented in step 48 and returned to repeat step 44 substantially as shown. If step 44 returns "No," step 50 initiates a second loop on the destination array index j by setting j=0. Step 52 tests src[i] for equality to dst[j] and, if "No," drops to the end of the j loop at step 54, where j is incremented in step 56 and returned to repeat step 52 substantially as shown. If step 52 returns "Yes," step 58 sets tmp[j]=dst[j] and step 60 logs tmp[j] for later exchange with src[i] before dropping to the end of the j loop at step 54 where an early loop exit may be (not shown).

After exiting the source array index i loop when step 46 returns "Yes," step 62 initiates a third loop on the temporary array index k by setting k=N. Step 64 tests tmp[k] for an array.slot value set earlier and, if "Yes," drops to the end of the k loop at step 66, where k is incremented in step 68 and returned to repeat step 64 substantially as shown. If step 64 returns "No," then step 70 sets tmp[k]=dst[k] before dropping to the end of the k loop at step 66. After exiting the temporary array index k loop when step 66 returns Yes, the temporary data element configuration is complete as is the data block exchange list, so step 72 may proceed to execute the block exchanges to complete the data movement needed for the specified array scaling operation.

The example provided above in connection with FIG. 7 is now described in terms of scaling method 40. In the example of FIG. 7:

```
N = 2*6=12;
M = 1*6=6;
src[i] = (0.0, 1.0, 0.2, 1.3, 1.4, 0.5, 0.1, 1.1, 1.2, 0.3, 0.4, 1.5)
for i = [0,11];
dst[j] = (0.0, 1.0, 2.0, 2.3, 1.4, 0.5, 0.1, 1.1, 2.1, 0.3, 2.4, 1.5,
0.2, 1.2, 2.2, 0.4, 1.3, 2.5) for j = [0,17];
tmp[k] = (a.s, a.s, a.s, a.s, a.s, a.s) for k = [12,17], where a.s =
array and slot to be determined as follows;
  For i = 0, 11:
  src[0] = dst[0], so do nothing;
  src[1] = dst[1], so do nothing;
  src[2] = 0.2 <> dst[2] = 2.0, so, for j = 0, 17:
      src[2] <> dst[j], so do nothing for all j except, for j = 12,
          src[2] = dst[12] = 0.2, so set tmp[j=12] = dst[i=2] = 2.0;
      and mark src[2] and tmp[12] for exchange;
  src[3] = 1.3 <> dst[3] = 2.3, so, for j = 0, 17:
      src[3] <> dst[j], so do nothing for all j except, for j = 16,
      src[3] = dst[16] = 1.3, so set tmp[j=16] = dst[i=3] = 2.3;and
      mark src[3] and tmp[16] for exchange;
  src[4] = dst[4], so do nothing;
  src[5] = dst[5], so do nothing;
  src[6] = dst[6], so do nothing;
  src[7] = dst[7], so do nothing;
  src[8] = 1.2 <> dst[8] = 2.1, so, for j = 0, 17:
      src[8] <> dst[j], so do nothing for all j except, for j = 13,
      src[8] = dst[13] = 1.2, so set tmp[j=13] = dst[i=8] = 2.1;and
      mark src[8] and tmp[13] for exchange;
  src[9] = dst[9], so do nothing;
  src[10] = 0.4 <> dst[10] = 2.4, so, for j = 0, 17:
      src[10] <> dst[j], so do nothing for all j except, for j = 15,
      src[10] = dst[15] = 0.4, so set tmp[j=15] = dst[i=10] = 2.4;and
      mark src[10] and tmp[15] for exchange;
  src[11] = dst[11], so do nothing;
  exit i loop with tmp[k] = (2.0, 2.1, a.s, 2.4, 2.3, a.s) for k =
[12,17], where a.s array and slot to be determined as follows;
  For k = 12, 17:
  tmp[12] = 2.0 is set, so do nothing;
  tmp[13] = 2.1 is set, so do nothing;
  tmp[14] = a.s is NOT set, so set tmp[14] = dst[k=14] = 2.2;
  tmp[15] = 2.4 is set, so do nothing;
  tmp[16] = 2.3 is set, so do nothing;
  tmp[17] = a.s is NOT set, so set tmp[17] = dst[k=17] = 2.5;
  exit k loop with tmp[k] = (2.0, 2.1, 2.2, 2.4, 2.3, 2.5) for k = [12,17].
```

With the temporary data element configuration completely determined, the exchanges of the marked block pairs may be accomplished.

Other criteria, such as maximizing the protection in the new storage before the data movement, may also be used to determine the configurations. Another example is shown in FIG. 8, where a new set of two bricks (B3+B4) with a temporary configuration selected to enforce the exchange rule is added to an existing set of two bricks (B1+B2) with a source configuration selected to ensure robustness against data loss. In this situation, maximum protection may be achieved by ensuring that the temporary data element configuration in (B3+B4) has three elements from each of the two new arrays. The temporary configuration of (B3+B4) is established using an embodiment of the method of this invention and appears very different from the conventional sequential configuration because of the additional destination configuration requirements for (B1'+B2'+B3'+B4'). Specifically for the example of FIG. 8, the data block exchanges required are (a total of twelve block copy operations):

```
Exchange 0.2 <–> 2.0
Exchange 0.4 with 2.4
Exchange 1.3 with 3.0
Exchange 0.3 with 3.1
Exchange 1.2 with 2.1
Exchange 2.1 with 0.3
```

The last exchange represents a chained move (both 2.1 and 0.3 are again moved for a second time) longer than a simple 2-block exchange, the necessity for which arises from the additional fault tolerance requirements (and the addition of more than a single brick in this example). The chained "safe move" embodiment of the method of this invention is described in more detail below in connection with FIG. 8.

While the examples of FIGS. 7-8 are described in terms of the (array.slot) notation where each slot in the pattern is embodied as a disk, this is not a limitation on the method of this invention and the description also applies to other embodiments, such as ranges of storage locations, for example, or ranges of logical block addresses (LBAs) in storage units that make up specific RAID arrays, such as the above examples using stripes configured in parity rotation.

The above discussion considers the "block exchange" embodiment of the method of this invention emphasizing the advantages of having handling the data copies as a sequence of simple exchanges. In many situations, it is preferable to use a preferred "safe move" embodiment of the block exchange embodiment, which is now described. The safe move embodiment is preferred because it ensures optimal protection and conservation of the starting state of the new space while protecting the data against loss during the move operation in the event of, for example, unexpected mid-transfer power loss. Until now, such protection must be afforded by copying the entire data set to a non-volatile temporary store before initiating the move operation so that an uncorrupted copy of all data is always available without regard for the timing of any unexpected interruption of the move operation.

According to the "safe move" embodiment, the state information is kept in non-volatile store, which may be disposed within a reserved area in the disk array itself, for example. The following brief example illustrates the steps of this safe move embodiment of a single block exchange and the maintenance of the state information. Assume that the contents of two data blocks, A and B, must be exchanged using a temporary data location denominated T. This sequence of steps is:

| 1 | copy contents of A to T | |
| 2 | set state to T = A | tells system that the contents of A are now in T |
| 3 | copy contents of B to A | |
| 4 | set state to B = A | tells system that the contents of B are now in location A |

-continued

| 5 | copy contents of T to B | |
|---|---|---|
| 6 | set state to A = B | tells system that the contents of A are no in B |

It can clearly be seen that halting the above sequence at any point permits the system to access any of the data without loss or corruption.

However, when using the "safe move" embodiment of the block exchange method as described above, the sequence of exchanges illustrated in the examples of FIGS. 7-8, for example, become less efficient than a single chained "safe move" for the following reasons. Except for the state updates, each "safe move" block exchange requires three data block transfer (copy) operations, which is 3n block transfers for every n block exchanges. However, for a chained "safe move" involving n data blocks, only (n+1) data block transfers are required, which is a significant improvement in efficiency for larger values of n.

Consider the following example of a chained "safe move" involving n=4 data blocks:

A->B->C->D.

Ignoring the state update steps, the "safe move" chained block transfer sequence is:

| 1 | copy contents of D to T |
|---|---|
| 2 | copy contents of C to D |
| 3 | copy contents of B to C |
| 4 | copy contents of A to B |
| 5 | copy contents of T to A |

Clearly, for this n=4 example, only (n+1)=5 data block transfers are required, where the n=2 exchanges A<->B, C<->D require (3n)=6 data block transfers.

Disadvantageously, limiting the block moves to exchanges can inhibit the pre-assignment of new storage in a maximally protected manner in some situations. This occurs because there are often relatively few possibilities for exchanges, and the additional requirements imposed for maximum initial protection can sometimes leave no overlap. However, the inventor observes that it is nearly always possible to create a single block-transfer chain that satisfies the protection requirements, which demonstrates that this chain move embodiment is more robust. Even in the unusual situations where a single block-transfer chain is not available, a multiple block-transfer chain embodiment remains the preferred method for reasons of efficiency and robustness.

Referring to the example of FIG. 8, the maximum protection requirement for the new bricks may be identified in the same manner as for a new system. This determines the number of slots of each array permitted in a given brick. As with the block exchange embodiment discussed above, the temporary data element configuration for the new bricks (B3+B4) is selected to minimize the number of slots moved to obtain the target data element configuration in bricks (B1'+B2'+B3'+B4') and additionally to minimize the number of "safe move" chains; preferably to one. These considerations are now illustrated in an example that repeats the array expansion operation shown in FIG. 8 where the source system includes two bricks (B1+B2) having a source data element configuration with two parity stripe arrays (0, 1) and the additional two new bricks (B3+B4) are assigned a temporary data element configuration with two new parity stripe arrays (2, 3). A series of "safe move" block transfers are made to create the desired target data element configuration having four parity slot arrays (0, 1, 2, 3) in the final expanded system (B1'+B2'+B3'+B4'). Because the new storage space must be made available immediately, and must be maximally protected against data loss during the necessary chained block transfers, each of the new bricks (B3, B4) must be assigned a temporary data element configuration that includes (in each brick) three slots from each of the two new parity stripe arrays (2, 3), substantially as shown.

Considering the source data element configuration in bricks B1-B2, the optimal pattern obviously includes three slots from each parity stripe array in each brick, substantially as shown. The desired maximally protected target data element configuration is shown in bricks (B1'+B2'+B3'+B4'). The requirement for minimizing the data movement implies that any disks in the target configuration containing slots from the new parity stripe arrays (2, 3) should remain in the new bricks (B3' and B4').

The contents of these slots are determined using the above criteria as follows:

Minimal data movement: The seven temporary slot assignments for disks D14, D15, D16, D17, D20, D21 and D23 are unchanged in the target data element configuration, as shown in FIG. 8. Thus, there are only five slots in the temporary data element configuration that must be moved to obtain the target data element configuration (D12, D13, D18, D19 and D22).

Maximal protection: In the target data element configuration, Brick B3' (disks D12-D17) includes two data elements from the parity stripe arrays 2 and 3, so there is room for up to one more data element from each parity stripe array 2 and 3. Brick B4' (disks D18-D23) includes one data element from parity stripe array 2 and two data elements from parity stripe array 3, so there is room for up to two more data elements from parity stripe array 2 and up to one more data element from parity stripe array 3.

Minimize the move chain: One of the 5! (120) possible data block move sequences is selected to provide a single chain of data block transfers. For example, the following move chain may be chosen here (a total of eleven block copy operations):

| Copy 2.0 to T |
|---|
| Copy 0.2 to 2.0 |
| Copy 3.0 to 0.2 |
| Copy 1.3 to 3.0 |
| Copy 2.1 to 1.3 |
| Copy 1.2 to 2.1 |
| Copy 2.4 to 1.2 |
| Copy 0.4 to 1.2 |
| Copy 3.1 to 0.4 |
| Copy 0.3 to 3.1 |
| Copy T to 0.3. |

There are other such data block transfer chains that meet these requirements. The chained move embodiment is preferred over the block exchange embodiment described above because of the improved satisfaction of both the maximum reliability requirement and the minimal data transfer requirement.

Figure 10:
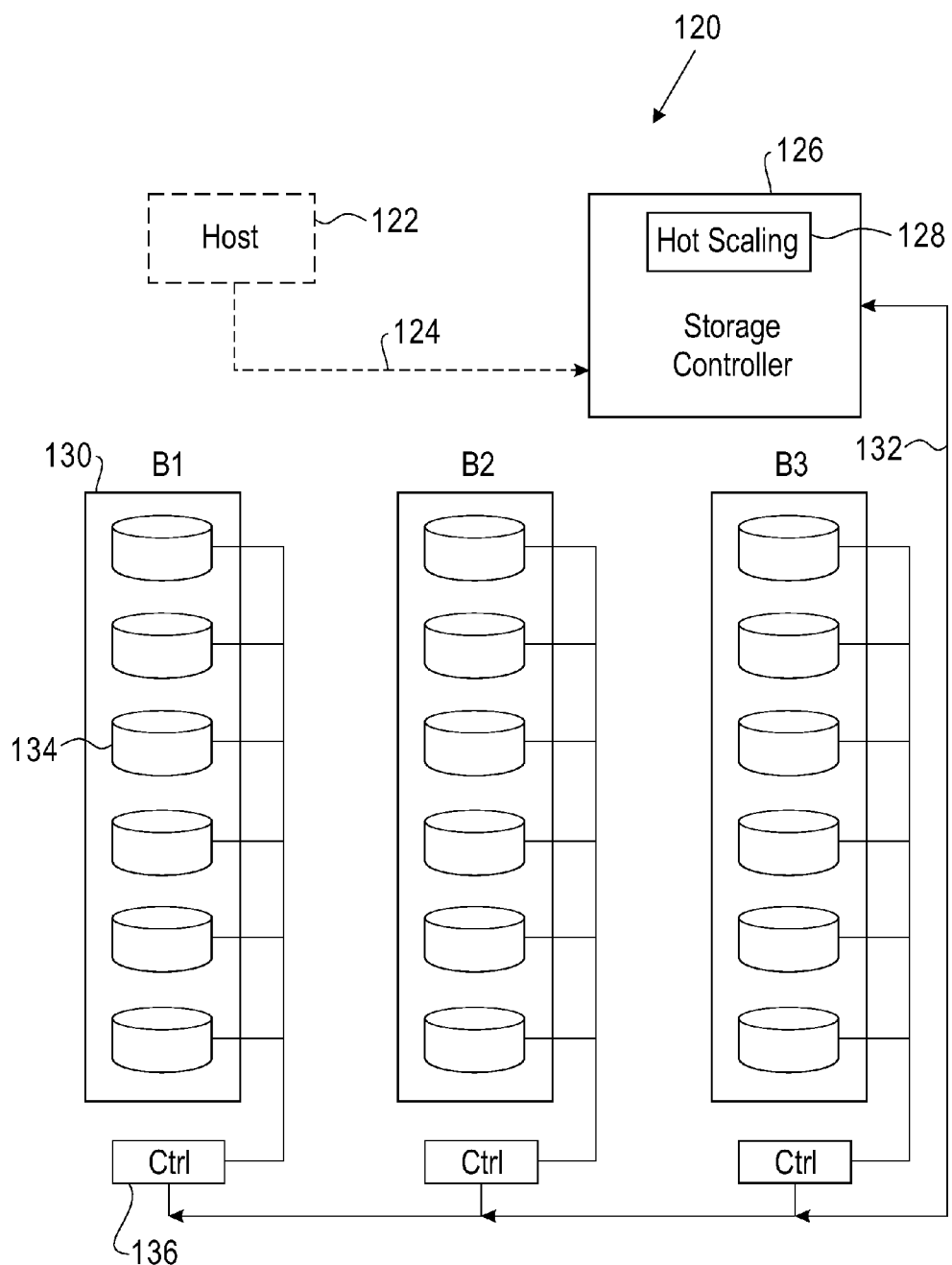
FIG. 10 is a block diagram illustrating an exemplary embodiment of the data storage system of this invention.

FIG. 10 is a block diagram illustrating an exemplary data storage system embodiment 120 of this invention. A host system 122 communicates with data storage system 120 over the data bus 124 to store and retrieve data (not shown). A storage controller 126 includes an internal hot scaling process 128 operating in accordance with the above teachings (FIG.

9). Storage controller 126 communicates with an array of bricks (B1, B2, and B3) exemplified by the brick 130. Each brick includes several HDDs, exemplified by the HDD 134 in brick 130, which are independently controlled by a local brick controller exemplified by the array controller 136 for brick 130.

Figure 11:
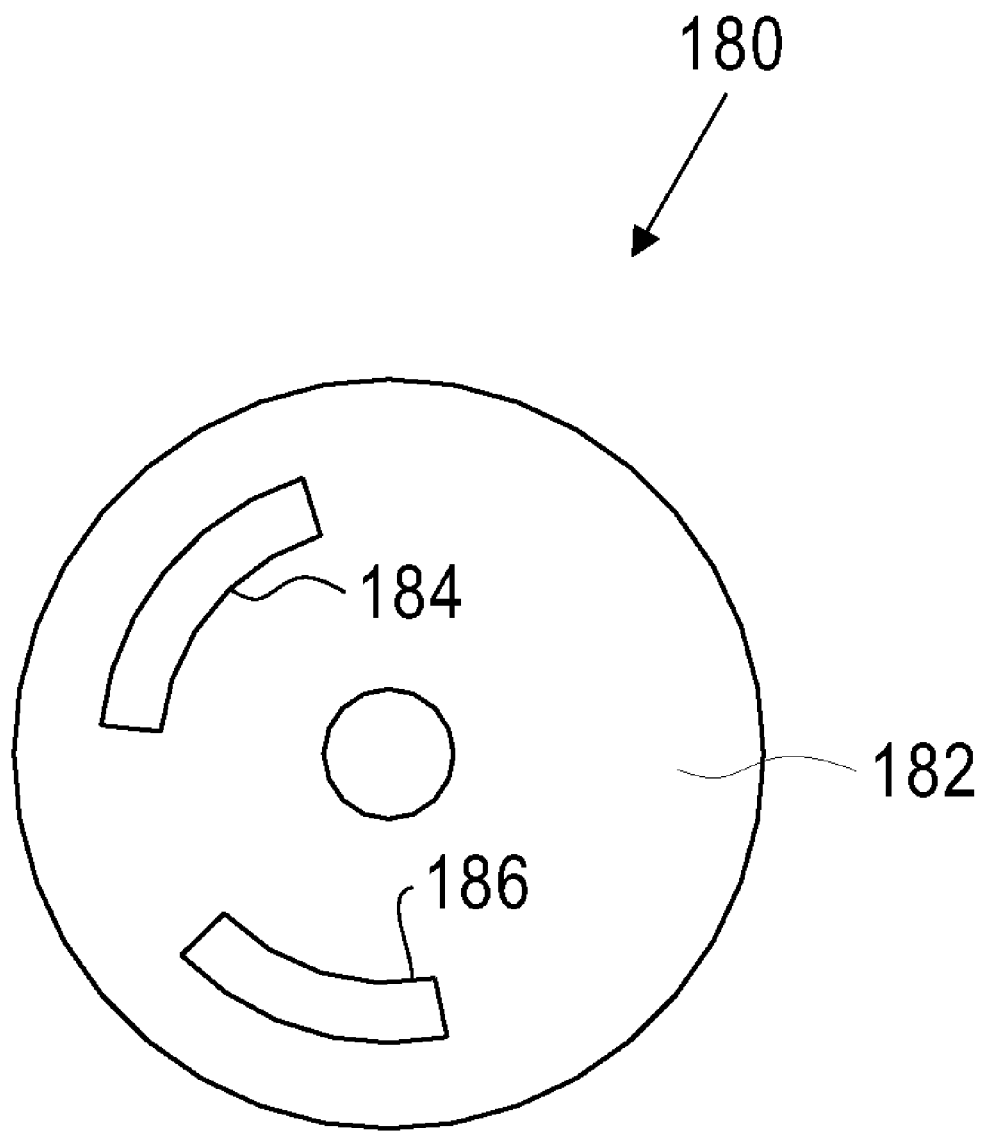
FIG. 11 is a block diagram illustrating an exemplary embodiment of a CDROM article of manufacture according to this invention.

FIG. 11 is a block diagram illustrating an exemplary CDROM article of manufacture embodiment 180 according to this invention and shows the computer readable storage medium 182 in which are incorporated several program code embodiments exemplified by the code embodiments 184 and 186.

It should be understood, of course, that the foregoing relates to exemplary embodiments of the invention and that modifications may be made without departing from the spirit and scope of the invention as set forth in the following claims.

I claim:

1. A method for rearranging data blocks including N coupled storage devices having a source data element configuration and a source data storage efficiency $E_S$, when adding M coupled storage devices including (N+M) coupled storage devices having a destination data storage efficiency $E_D$, wherein M and N are positive integers, the method comprising the unordered steps of:
    selecting a destination data element configuration for the (N+M) coupled storage devices without initializing each of the (N+M) coupled storage devices to zero that provides the destination data storage efficiency $E_D$, wherein a Hamming distance of the (N+M) storage devices is greater than two;
    selecting a temporary data element configuration for the M coupled storage devices for which the exchange of one or more data blocks between the temporary data element configuration and the source data element configuration produces the destination data element configuration;
    identifying the data blocks that can be exchanged between the temporary data element configuration and the source data element configuration to produce the destination data element configuration;
    distributing new data blocks in a diagonal configuration;
    maintaining the location of the diagonal configuration for adding new stripes within an original set of the N+M coupled storage devices;
    rearranging each of the stripes such that protection against controller failure is maximized;
    exchanging the identified data blocks between the temporary data element configuration and the source data element configuration to produce the destination data element configuration having the destination data storage efficiency $E_D$, wherein a number of the data blocks is equal to a number of parity blocks;
    reducing control complexity by creating a cyclic destination configuration between diagonal and row configurations for each group of N coupled storage devices between N and (N+M) coupled storage devices;
    limiting movement of data from the identified data blocks to exchanges between the data blocks in the (N+M) coupled storage devices; and
    reducing data movement from the identified data blocks by not overwriting duplicate data being transferred from one of the identified data blocks to another one of the identified data blocks.

2. The method of claim 1 wherein the destination data storage efficiency $E_D$ does not exceed the source data storage efficiency $E_S$.

3. The method of claim 1 further comprising the step of:
for each integer value of i from 1 to N, performing the steps of:
    if the $i^{th}$ data element of the source data element configuration is equal to the $i^{th}$ data element of the destination configuration, doing nothing; otherwise
    for each integer value of j from (N+1) to (N+M), performing the steps of:
        if the $j^{th}$ data element of the destination data element configuration is not equal to the $i^{th}$ data element of the source data element configuration, doing nothing; otherwise
        setting the $j^{th}$ data element of the temporary data element configuration equal to the $i^{th}$ data element of the destination data element configuration.

4. The method of claim 3 further comprising the step of:
for each integer value of k from (N+1) to (N+M), performing the steps of:
    if the $k^{th}$ data element of the temporary data element configuration was set in a previous step, doing nothing; otherwise
    setting the $k^{th}$ data element of the temporary data element configuration equal to the $k^{th}$ data element of the destination data element configuration.

5. The method of claim 4 further comprising the step of:
for each integer values of i from 1 to N, performing the steps of:
    if the $i^{th}$ data element of the source data element configuration is equal to the $i^{th}$ data element of the destination data element configuration, doing nothing; otherwise
    for each integer value of j from (N+1) to (N+M), performing the steps of:
        if the $j^{th}$ data element of the destination data element configuration is not equal to the $i^{th}$ data element of the source data element configuration, doing nothing; otherwise
        identifying the $i^{th}$ data block of the source data element configuration for exchange with the $j^{th}$ data block of the temporary data element configuration.

6. The method of claim 1 further comprising the step of:
for each integer values of i from 1 to N, performing the steps of:
    if the $i^{th}$ data element of the source data element configuration is equal to the $i^{th}$ data element of the destination data element configuration, doing nothing; otherwise
    for each integer value of j from (N+1) to (N+M), performing the steps of:
        if the $j^{th}$ data element of the destination data element configuration is not equal to the ith data element of the source data element configuration, doing nothing; otherwise
        identifying the $i^{th}$ data block of the source data element configuration for exchange with the $j^{th}$ data block of the temporary data element configuration.

7. The method of claim 1 further comprising the step of:
initiating operation of the data storage system under the control of a host system to store and retrieve data before completion of the data block rearrangement.

8. The method of claim 1 further comprising the step of:
identifying a single chained move of data blocks between the temporary data element configuration and the source data element configuration for producing the destination data element configuration having the destination data storage efficiency $E_D$; and
performing the single chain of data block exchanges between the temporary data element configuration and the source data element configuration to produce the destination data element configuration having the destination data storage efficiency $E_D$.

9. A data storage system comprising:
N coupled storage devices including a source data element configuration and a source data storage efficiency $E_S$ where N is a positive integer;
a local controller for each of the N coupled storage devices for controlling data movement within one of the N coupled storage devices; and
a storage controller for rearranging data blocks when adding M coupled storage devices to create an expanded data storage system including (N+M) coupled storage devices having a destination data element configuration and a destination data storage efficiency $E_D$, wherein M is a positive integer,
wherein the storage controller selects a destination data element configuration for the (N+M) coupled storage devices without initializing each of the (N+M) coupled storage devices to zero that provides the destination data storage efficiency $E_D$, wherein a Hamming distance of the (N+M) storage devices is greater than two,
wherein the storage controller selects a temporary data element configuration for the M coupled storage devices for which the exchange of one or more data blocks between the temporary data element configuration and the source data element configuration produces the destination data element configuration,
wherein the storage controller identifies the data blocks that can be exchanged between the temporary data element configuration and the source data element configuration to produce the destination data element configuration, and
wherein the storage controller exchanges the identified data blocks between the temporary data element configuration and the source data element configuration to produce the destination data element configuration having the destination data storage efficiency $E_D$;
wherein the storage controller removes duplicate stripe numbers from the N coupled storage devices for ensuring the loss of no more than one data block per slot upon a failure of one of the N coupled storage devices;
wherein the storage controller adds new data blocks in a reverse diagonal configuration with the addition of a second group of N coupled storage devices;
wherein the storage controller reduces control complexity by creating a cyclic destination configuration between diagonal and row configurations for each group of N coupled storage devices between N and (N+M) coupled storage devices; and
wherein the storage controller limits movement of data from the identified data blocks to exchanges between the data blocks in the (N+M) coupled storage devices.

10. The system of claim 9 wherein the destination data storage efficiency $E_D$ does not exceed the source data storage efficiency $E_S$.

11. The system of claim 9, wherein the storage controller repeats, for each integer value of i from 1 to N, the steps of:
if the $i^{th}$ data element of the source data element configuration is equal to the $i^{th}$ data element of the destination data element configuration, doing nothing; otherwise
for each integer value of j from (N+1) to (N+M), performing the steps of:
if the $j^{th}$ data element of the destination data element configuration is not equal to the ith data element of the source data element configuration, doing nothing; otherwise
setting the $j^{th}$ data element of the temporary data element configuration equal to the $i^{th}$ data element of the destination data element configuration.

12. The system of claim 11, wherein the storage controller repeats, for each integer value of k from (N+1) to (N+M), the steps of
if the $k^{th}$ data element of the temporary data element configuration was set in a previous step, doing nothing; otherwise
setting the $k^{th}$ data element of the temporary data element configuration equal to the $k^{th}$ data element of the destination data element configuration.

13. The system of claim 12, wherein the storage controller repeats, for each integer values of i from 1 to N, the steps of
if the $i^{th}$ data element of the source data element configuration is equal to the $i^{th}$ data element of the destination data element configuration, doing nothing; otherwise
for each integer value of j from (N+1) to (N+M), performing the steps of:
if the $j^{th}$ data element of the destination data element configuration is not equal to the $i^{th}$ data element of the source data element configuration, doing nothing; otherwise
identifying the $i^{th}$ data block of the source data element configuration for exchange with the $j^{th}$ data block of the temporary data element configuration.

14. The system of claim 9, wherein the storage controller repeats, for each integer values of i from 1 to N, the steps of
if the $i^{th}$ data element of the source data element configuration is equal to the $i^{th}$ data element of the destination data element configuration, doing nothing; otherwise
for each integer value of j from (N+1) to (N+M), performing the steps of:
if the $j^{th}$ data element of the destination data element configuration is not equal to the ith data element of the source data element configuration, doing nothing; otherwise
identifying the $i^{th}$ data block of the source data element configuration for exchange with the $j^{th}$ data block of the temporary data element configuration.

15. The system of claim 9, wherein the storage controller initiates operation of the data storage system under the control of a host system to store and retrieve data before completion of the data block rearrangement.

16. The system of claim 9, wherein:
the storage controller identifies a single chained move of data blocks between the temporary data element configuration and the source data element configuration for producing the destination data element configuration having the destination data storage efficiency $E_D$; and
the storage controller performs the single chain of data block exchanges between the temporary data element configuration and the source data element configuration to produce the destination data element configuration having the destination data storage efficiency $E_D$.

17. An article of manufacture including N coupled computer storage devices having a source data element configuration and a source data storage efficiency $E_S$ for rearranging data blocks when adding M coupled computer storage devices to having a destination data element configuration and a destination data storage efficiency $E_D$, wherein M and N are positive integers, the article of manufacture comprising:

(N+M) coupled computer storage devices;

a computer readable storage medium;

a computer program code embodiment sending block state information to a centralized control area after each of the exchanges between the data blocks;

a computer program code embodiment limiting movement of data from the data blocks to exchanges between the data blocks in the (N+M) coupled computer storage devices;

a computer program code embodiment reducing data movement from the data blocks by not overwriting duplicate data being transferred from one of the data blocks to another one of the data blocks;

a computer program code embodiment in the medium to select a destination data element configuration for the (N+M) coupled computer storage devices that provides the destination data storage efficiency $E_D$;

a computer program code embodiment in the medium to select a temporary data element configuration for the M coupled computer storage devices for which the exchange of one or more data blocks between the temporary data element configuration and the source data element configuration produces the destination data element configuration;

a computer program code embodiment in the medium that adds new data blocks in a diagonal configuration with the addition of a second group of N coupled storage devices;

a computer program code embodiment that rearranges each of a plurality of stripes such that protection against controller failure is maximized;

a computer program code that groups all stripes of the data blocks in the (N+M) coupled computer storage devices after the data blocks in the (N+M) coupled computer storage devices utilize a minimum of 2N disks;

a computer program code embodiment in the medium to identify the data blocks that can be exchanged between the temporary data element configuration and the source data element configuration to produce the destination data element configuration; and a computer program code embodiment in the medium to exchange the identified data blocks between the temporary data element configuration and the source data element configuration to produce the destination data element configuration having the destination data storage efficiency $E_D$ wherein a number of the data blocks is equal to a number of parity blocks.

18. The article of manufacture of claim 17 wherein the destination data storage efficiency $E_D$ does not exceed the source data storage efficiency $E_S$.

19. The article of manufacture of claim 17 further comprising:

a computer program code embodiment in the medium that causes the data storage system to initiate operation under the control of a host system to store and retrieve data before completion of the data block exchanges.

20. The article of manufacture of claim 17 further comprising:

a computer program code embodiment in the medium that causes the data storage system to identify a single chained move of data blocks between the temporary data element configuration and the source data element configuration for producing the destination data element configuration having the destination data storage efficiency $E_D$; and a computer program code embodiment in the medium that causes the data storage system to perform the single chain of data block exchanges between the temporary data element configuration and the source data element configuration to produce the destination data element configuration having the destination data storage efficiency $E_D$.

* * * * *